United States Patent
Hysell et al.

(10) Patent No.: US 9,570,940 B2
(45) Date of Patent: Feb. 14, 2017

(54) BACKUP BATTERY SYSTEMS FOR TRAFFIC CABINETS

(75) Inventors: Tim Hysell, Tualatin, OR (US); Dan Sisson, Aumsville, OR (US); Mark William Slobodnik, Salem, OR (US); Jeffrey William Slobodnik, Salem, OR (US)

(73) Assignee: ZincFive, LLC, Wilsonville, OR (US)

(*) Notice: Subject to any disclaimer, the term of this patent is extended or adjusted under 35 U.S.C. 154(b) by 645 days.

(21) Appl. No.: 13/117,061

(22) Filed: May 26, 2011

(65) Prior Publication Data

US 2011/0291565 A1 Dec. 1, 2011

Related U.S. Application Data

(60) Provisional application No. 61/348,242, filed on May 26, 2010.

(51) Int. Cl.
*H02J 9/06* (2006.01)
*H01M 10/04* (2006.01)
*H01M 10/42* (2006.01)

(52) U.S. Cl.
CPC .......... *H02J 9/061* (2013.01); *H01M 10/0436* (2013.01); *H01M 10/4207* (2013.01); *Y10T 307/625* (2015.04)

(58) Field of Classification Search
CPC . H02J 9/061; H01M 10/0436; H01M 10/4207
USPC ....... 307/46, 66; 429/99, 100, 452; 320/101, 320/107, 110, 112, 116; 340/907, 908
See application file for complete search history.

(56) References Cited

U.S. PATENT DOCUMENTS

| | | | |
|---|---|---|---|
| 6,225,778 B1* | 5/2001 | Hayama et al. | 320/112 |
| 7,808,402 B1* | 10/2010 | Colby | 340/907 |
| 2004/0012371 A1* | 1/2004 | Ott et al. | 320/116 |
| 2006/0265853 A1* | 11/2006 | Povolny | 29/462 |
| 2007/0020516 A1* | 1/2007 | Yoon | 429/152 |
| 2007/0030171 A1* | 2/2007 | Cheevarunothai et al. | 340/941 |
| 2011/0193482 A1* | 8/2011 | Jones | H05B 37/04 315/87 |

* cited by examiner

*Primary Examiner* — Douglas W Owens
*Assistant Examiner* — Jonathan Cooper
(74) *Attorney, Agent, or Firm* — Cochran Freund & Young LLC; Samuel M. Freund

(57) ABSTRACT

Backup battery systems for traffic cabinets that control traffic lights are provided herein. Backup battery systems include a controller operably coupled to 1 or more backup battery panels having rechargeable battery cells. Preferred systems can fit and operate entirely within the traffic cabinet.

10 Claims, 6 Drawing Sheets

BACKUP BATTERY SYSTEMS FOR TRAFFIC CABINETS

CROSS-REFERENCE TO RELATED APPLICATIONS

This application claims priority to U.S. Provisional Application No. 61/348,242 titled Traffic Cabinet Battery, filed May 26, 2010, which is expressly incorporated by reference in its entirety.

FIELD OF THE INVENTION

The present invention generally relates to powering a traffic control cabinet during a failure of the primary utility power. Examples of a utility power failure can include a complete loss of the AC line power or the utility power is in such a state as to affect the reliability and function of the traffic cabinet components. More specifically, the invention provided herein relates to utilizing the unused space within a traffic control cabinet to house a complete and intelligent uninterruptible power supply (UPS) battery powered backup system.

BACKGROUND OF THE INVENTION

Traffic lights are electronic signaling devices positioned at various locations on roads, including intersections and crossings, to control the flow and direction of motorized vehicles, cyclists, and pedestrians. Most traffic light signaling is controlled by electronic circuitry housed in a nearby traffic cabinet and powered by a local electricity provider. When a power failure occurs, traffic lights go dark which creates an unsafe condition at the intersection or crossing as drivers and pedestrians are no longer being directed by traffic signaling. To avoid this situation, the power supply of some traffic cabinets is backed up with an Uninterruptible Power Supply (UPS) or Battery Backup System (BBS) system to power the traffic lights and controls during a power failure. In general, prior art UPS or BBS systems contain large lead-acid batteries and require an unnecessarily large amount of space near or against the traffic cabinet. As examples, a secondary cabinet is sometimes added to house the lead-acid batteries or the lead-acid batteries take up valuable rack space within the traffic cabinet.

Accordingly, most government agencies do not add a UPS system to their traffic cabinets because of the additional cost of the additional battery cabinet or the lack of additional rack space available in the cabinet. Additional reasons for not utilizing a UPS system are that tearing up the existing sidewalk to add another cabinet is expensive and the larger footprint on the sidewalk means less room for pedestrians and creates more of a hazard, especially for handicapped people, senior citizens, and young children. Additionally, the use of lead-acid batteries dictates a longer re-charge time and greatly increases maintenance issues. These problems are exacerbated during instances of prolonged use of the UPS system.

It is further noted that maintenance of lead-acid batteries is a major problem as most government agencies do not have the man-power nor the budgeted funds to perform the regular maintenance required to keep lead-acid batteries operating at rated capacity. More specifically, the lead-acid batteries in a large number of installed UPS systems are dead or are of very low capacity when called upon to power a traffic light. Disposing of and replacing dead lead-acid batteries also represents a significant cost for most traffic agencies using a power backup system. This problem is pronounced as lead-acid batteries are notorious for having short lives in backup traffic applications.

For the above reasons, there is a need for UPS systems for traffic control cabinets that can easily be installed in the existing cabinets and are intelligent so they can perform their own maintenance. UPS systems herein can advantageously include redundant components such that individual or even multiple power failures will not disrupt power flow and control of traffic signaling. In comparison to lead-acid batteries, the UPS systems herein can utilize a battery chemistry that has a higher energy density and longer life span, in addition to being safer and easier to recycle. Such systems would add enormously to the reliability and safety of traffic signals.

SUMMARY

Embodiments herein are directed to a backup battery system for a traffic cabinet that supplies power to a traffic light and having a battery panel comprising a plurality of rechargeable non lead-acid battery cells and having a thickness of 2 inches or less; an electronic controller operably coupled to the battery panel such that it can transmit power from the battery panel to the traffic cabinet in a sufficient amount to power the traffic light when there is a primary power failure; wherein the battery panel and the controller are configured to be positioned and operably functional within the traffic cabinet.

Further embodiments are directed to traffic cabinet system including a traffic cabinet having a side walls, a front door, an internal rack and operably coupled to a primary power source configured to supply power to a traffic light; a battery panel comprising a plurality of rechargeable battery cells; and an electronic controller operably coupled to the battery panel such that it can transmit power from the battery panel to the traffic cabinet in a sufficient amount to power the traffic light when there is a primary power failure; and wherein the battery panel and the controller are positioned and operably functional within the traffic cabinet.

BRIEF DESCRIPTION OF THE DRAWINGS

The following figures are included as an aid to understanding various aspects of the invention. The invention may be better understood by referencing one or more of these drawings in combination with the detailed description of the parts and their functions. It will be appreciated that the drawings are not necessarily to scale, with emphasis instead being placed on illustrating the various aspects and features of embodiments of the invention, in which.

DETAILED DESCRIPTION OF THE INVENTION

Figure 1A:
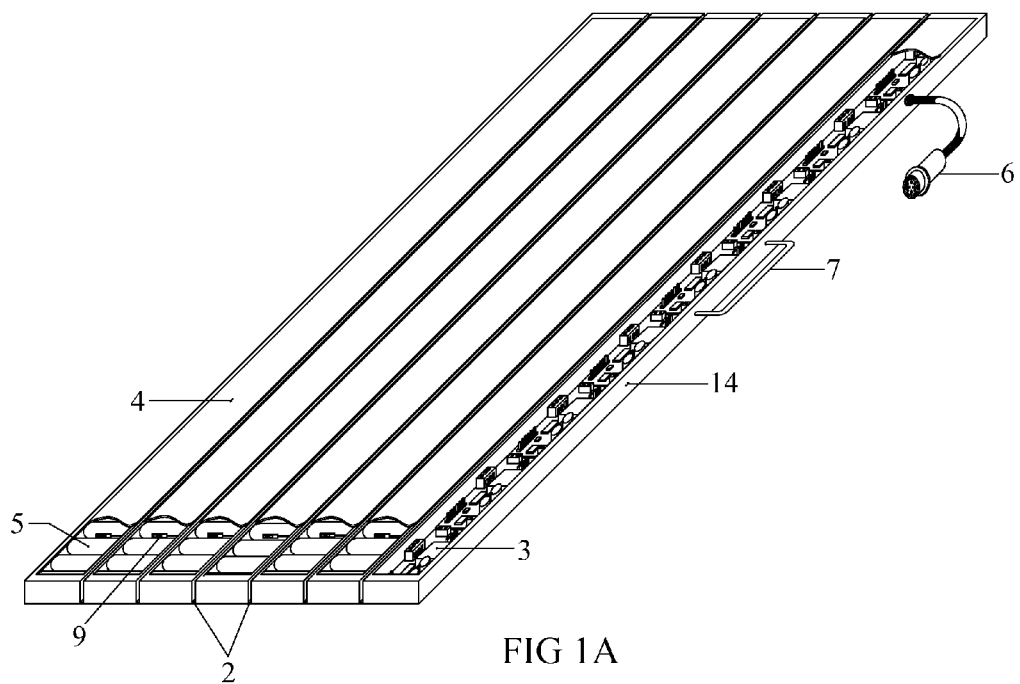
FIG. 1A is perspective view of a flexible battery panel in an unflexed configuration.

Embodiments of the present invention are described below. It is, however, expressly noted that the present invention is not limited to these embodiments, but rather the intention is that modifications that are apparent to the person skilled in the art and equivalents thereof are also included.

The present invention provides an intelligent battery backup system for positioning within traffic cabinets. In general, and as shown in the systematic view of FIG. 4 the battery systems herein includes a controller/inverter 16 in operable connection with one or more battery panels 21, 30-33. The number of battery panels used in a given system is dependent upon the power needs of a given traffic cabinet and corresponding traffic lights under its control. The number and type of battery panels should be sufficient to power the traffic cabinet upon a main power supply failure. According to preferred embodiments each of the battery panels are configured and sized to fit within the inside of the traffic cabinet with the door closed. As discussed in the Background section above, lead-acid batteries which are currently used as traffic cabinet backup batteries cannot be easily installed within the inside of most existing traffic cabinets. This is because most traffic cabinets, such as the 332 cabinet and NEMA style cabinets provide very limited internal space beyond the space reserved for the existing cabinet components. Available space can include space between the mounting rail 11 and the side cabinet wall 12 and rack space, for example. Conventional lead-acid batteries are too large and will not fit within these spaces, which is why additional cabinets are often utilized for lead-acid battery backup systems. The systems herein can be installed within traffic cabinets without having to modify the cabinet itself.

Preferred battery cells 5 used with the battery panels herein can be any suitable type of rechargeable battery cell such as Ni-iron, Ni-cadmium, NiH2, NiMH, Ni-Zinc, Lithium based, and the like for example. According to preferred embodiments, the battery cells 5 are not lead-acid based. According to even more specific embodiments, it is preferred that the battery cells used in the battery panels herein have a higher energy density than lead acid batteries and/or longer life spans. Preferably the battery panels herein can include a handle 7 to allow for easy installation and removal. The handle 7 is advantageously configured to be on the front side of the battery panel 14 when it is installed in the cabinet 10. Additionally the battery panels herein preferably include a connector cable 6 or other communicative/power transfer means between the battery panel and the controller/inverter 16. The connector cable 6 allows data of various monitored parameters to be communicated to the controller/inverter 16 and a corresponding response from the controller/inverter 16 to the battery panel based on the value(s) of the monitored parameters. The connector cable 6 also allows for power to be transmitted from the battery panel to the controller/inverter 16 during a primary power failure such that the controller/inverter 16 can redirect the backup power to the traffic cabinet and the traffic lights. The connector cable 6 is configured to plug into the converter/inverter 16 when the battery panel is positioned in the traffic cabinet.

Figure 1B:
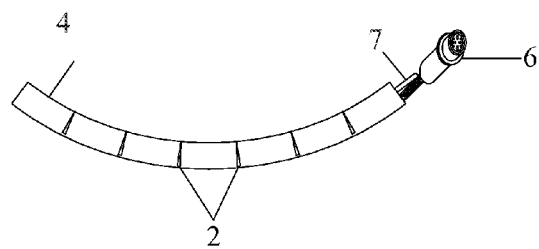
FIG. 1B is a side view of a flexible battery panel in a flexed configuration.
Figure 2B:
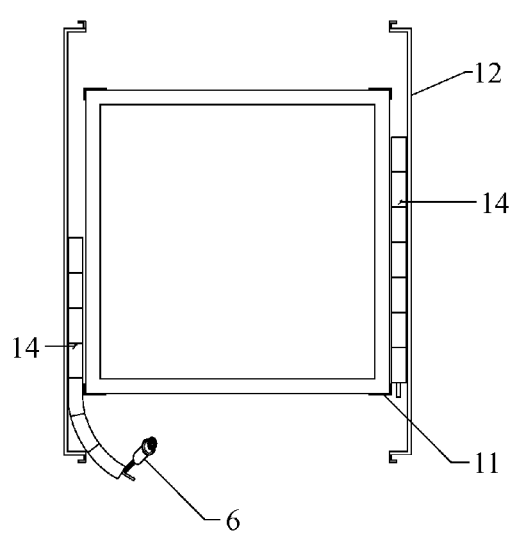
FIG. 2B is a top view of a 332 traffic cabinet.
Figure 2A:
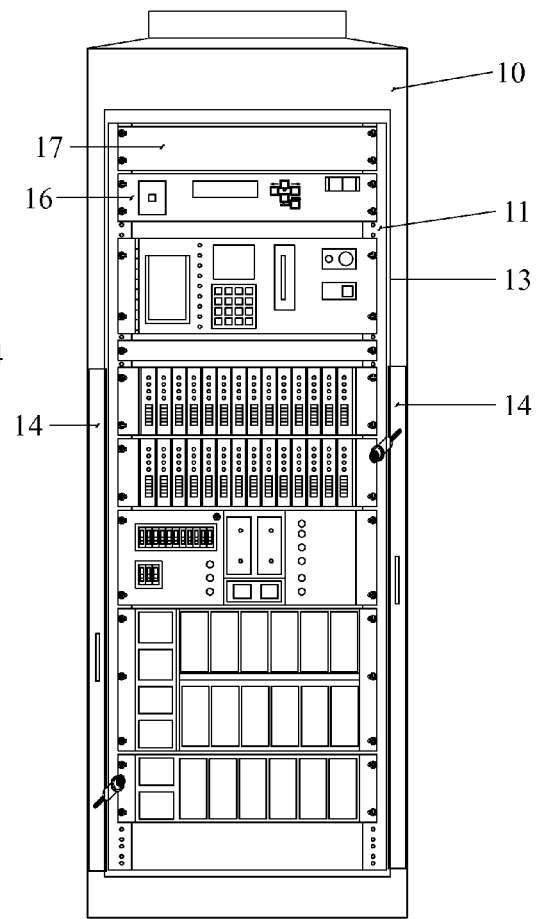
FIG. 2A is a front view of an opened 332 traffic cabinet.

The battery panels themselves can be designed and manufactured in several configurations to be installed in a desired traffic cabinet. According to one embodiment, one or more battery panels of the backup system can be a flexible battery panel 14 as shown in FIGS. 1A and 1B. The flexible battery panel is configured to have means for allowing the panel 14 to flex, such that it can be positioned into a curved configuration, such as shown in FIG. 1B. According to one embodiment, the casing of the battery panel is preferably made of a rigid material, or semi-rigid material, including plastic, such as a thermoplastic, and includes a plurality of slits 2 that define columns 4 that house strings of multiple battery cells 5. The slits 2 act as hinges to allow the battery panel 14 to flex. Other hinge configurations can also be used with the flexible battery panel. Advantageously, the flexible capacity allows the battery panel 14 to be inserted into the space between the mounting rails 11 and a side wall 12 of a traffic cabinet 10 as shown in FIGS. 2A and 2B. FIGS. 2A and 2B respectively depict a front and top view of a 332 traffic cabinet 10. FIG. 2A shows the cabinet 10 in an opened configuration where the door frame is defined by a perimeter 13. While the flexible battery panel 14 has the potential to be flexed it can also be used in an unflexed position. FIG. 2B shows two flexible battery panels 14 on both sides of a traffic cabinet 10, with the left side battery panel being in a flexed position while the right side battery panel is in an unflexed position. Preferably the flexible battery panel 14 is configured such that it has sufficient flexibility to fit between the mounting rail 11 and the side cabinet wall 12 and flex around a portion of the front face of the internal cabinetry components when the front door of the cabinet 10 is closed.

Figure 3:
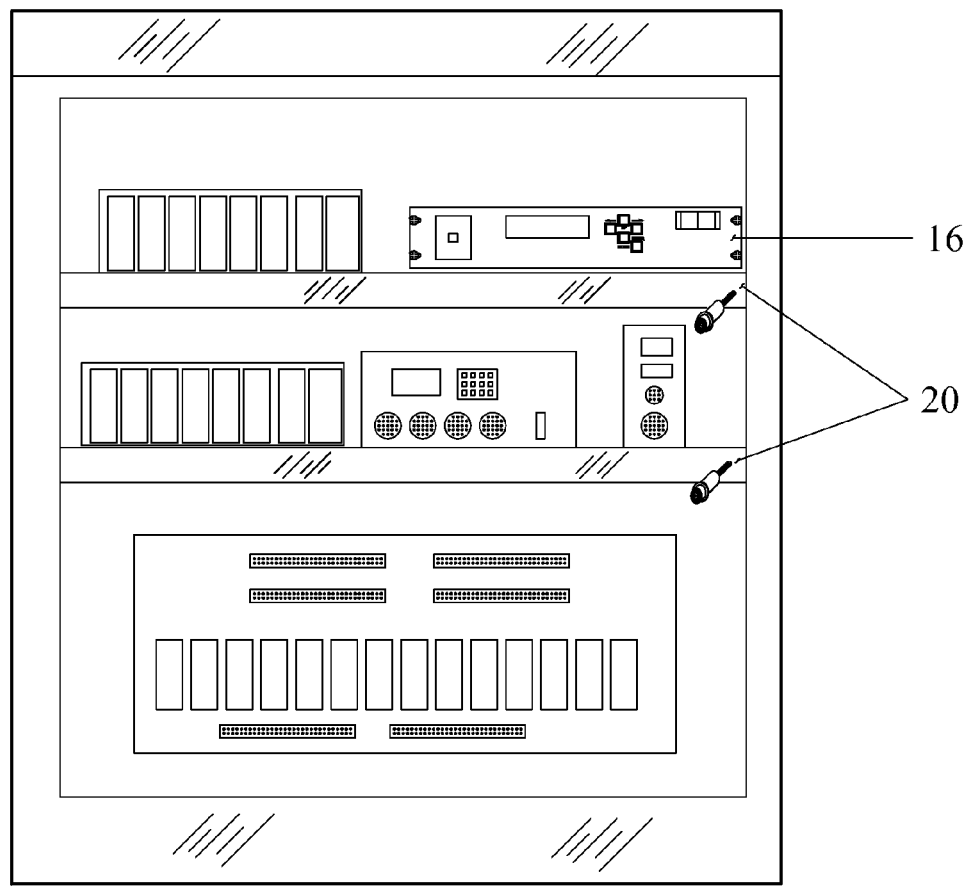
FIG. 3 is the front view of an opened NEMA style traffic cabinet.

In addition to the use of flexible battery panels 14, non-flexible battery panels 17 can also be installed within traffic cabinets as well. As shown in FIG. 2A, a non-flexible battery panel 17 can be installed on the mounting rack 11, such that it is parallel with the shelving for example. One or more battery panels 20 can also be used as shelves on a rack in a NEMA style traffic cabinet as shown in FIG. 3. For rack mounting embodiments, the battery panels 17 and 20 can be mounted to the rack itself, such as on a shelf or to define a shelf, and/or the components of the rack, such as the controller/invertor 16. Any suitable mounting means can be utilized to position the battery panels 17 and 20 in their respective cabinets, non-exclusively including screws, bolts, mounting hardware, and the like. As the battery panels utilized in the backup systems herein may need to be replaced or fixed, the mounting means used herein is preferably readily releasable, such that the battery panels are not welded to the traffic cabinet, for example. Alternatively, the panels 17 and 20 can simply be positioned on the rack without secured mounting. For battery panels installed between the rack 11 and cabinet side wall 12, such as the flexible battery panel 14, the battery can be wedged between these two surfaces such that they are secure. Alternatively, these battery panels can be mounted using any suitable mounting means. It should be noted that according to non-preferred embodiments and depending on the specific cabinet space and battery panels, flexible battery panels can be installed on the mounting rack 11 and non-flexible battery panels can be installed between the mounting rack 11 and the cabinet side wall 12. Additionally the battery panels can be mounted on the internal doors of the traffic cabinet. Due to the limited space within traffic cabinets, it is preferred that the battery panels provided herein have a thickness of 2 inches or less. The width and length of the battery panels should be of a dimension that allows for positioning at the desired location (e.g., rack, shelving, door, side) within the traffic cabinet and allows the traffic cabinet door to close.

Preferred battery panels and controller/inverters described in the backup systems herein can be configured and sized to be installed in all NEMA traffic cabinets including the following types: M, M36, MSX, MSX36, P40, P44, R40, R44. Additionally the systems provided herein are advantageously configured to be installed within 332 and 334 traffic cabinets.

Figure 4:
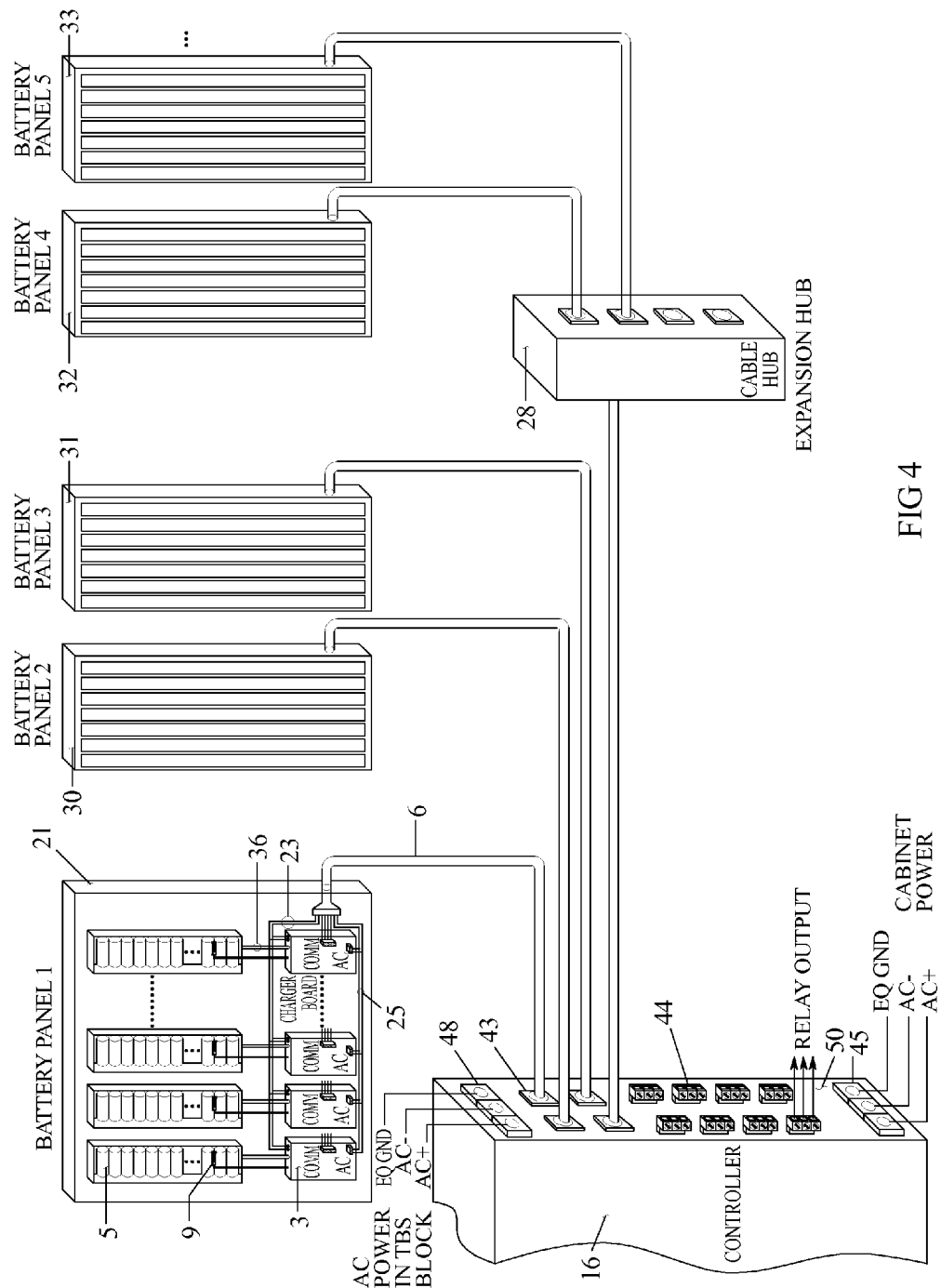
FIG. 4 a systematic view of a backup battery system.

As shown in cutaway views of the battery panel 14 shown in FIG. 1A and the battery panel 21 shown in FIG. 4, the battery panels utilized in the systems herein can advantageously be organized as several independent strings of battery cells 5, such that each string is operably coupled to its own battery charging board 3 such that the strings can individually be charged or discharged. As the cutaway views of FIG. 1A, a plurality of battery charging boards 3 can be arranged as a column of the battery panel 14 that is positioned alongside, such as parallel to the columns 4 of battery cell 5 strings. Alternatively, and as shown in FIG. 4, the charging boards 3 can be aligned in a row perpendicular to the columns 4 of battery cell 5 strings. Each charging board 3 can include an operable electrical connection 36 to its respective battery cell 5 string to allow for charging or discharging and monitoring.

The charging boards 3 of the battery panels herein are preferably controlled by a controller/inverter 16. An output cable 23 can interconnect the multiple charger boards 3 and transmit monitored data, such as power capacity and/or temperature information, to the controller/inverter 16 via the connector cable 6. Advantageously, the outputs from all of the battery chargers 3 from a single battery panel are operably coupled together to provide one input to the controller/inverter 16 through the connector cable 6. The connector cable 6 can also provide AC power to the charger boards 3 through an interconnecting cable 25. The independence of the battery cell strings is advantageous in allowing multiple failures in the system and/or the batter panel while still allowing the system to provide sufficient backup power. This internal organization of the battery panels with independent chargers associated with each string of batteries is also advantageous in providing constant recharge times regardless of how many battery panels are added to the system. According to preferred embodiments, each charger board 3 is intelligent, such that the status of each string of batteries can be continually and/or constantly reported back to the controller/inverter 16 so instantaneous or near instantaneous system capacity can be determined. According to even further embodiments, the controller/inverter 16 can also be operably configured to turn on or shut down any string of batteries to configure the system for optimum operation.

Figure 5:
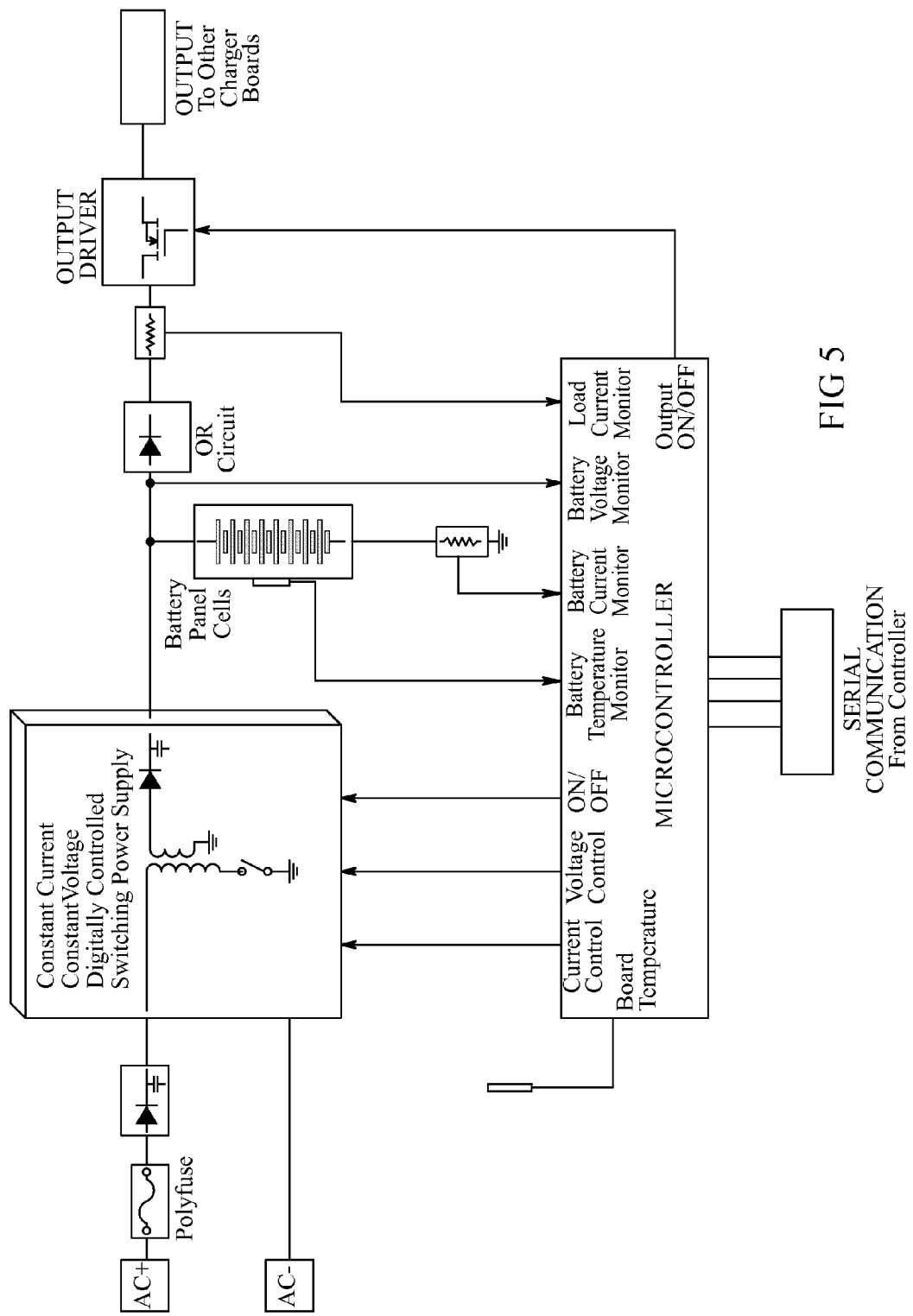
FIG. 5 is a block diagram of a battery charger board.

A block diagram of a preferred charger board and its relationship to other battery panels, a controller/inverter 16, and other charger boards is depicted in FIG. 5. While the charger boards 3 are configured to control the charging and discharging parameters of the battery cells 5, they are also preferably configured to control the battery panel connection to the main controller/inverter 16 via a connector cable 6. Charger boards 3 can also be configured to monitor other fluctuating features of the battery cells 5, non-exclusively including load current, battery current, battery voltage, and battery temperature. The status of these monitored features can be relayed to the controller/inverter 16 from the charger board 3 via a connector cable 6 for appropriate response if any by the controller/inverter 16. As one example, one or more temperature sensors 9 can be positioned a cell strings and operably coupled to the charger boards 3 via a connection cable or wire. This embodiment allows for the temperature of the battery cells 5 to be constantly and/or continuously monitored. Once temperature data is received, the controller/inverter 16 can adjust various parameters to accommodate for a temperature change. The charger board 3 temperature can also monitored to check for any kind of over current condition and can shut down the charger circuitry. For example, if the AC power load is too great to charge all of the battery panels at once, the controller/inverter 16 can select which panels are allowed to charge at a given time.

As stated above, the charger boards 3 communicate with the controller/inverter 6 through the battery panel connector cable 6. The controller/inverter 15 is preferably configured such that it can turn all of the battery chargers on or off simultaneously or individually depending on cabinet requirements over the serial communication port. Since each charger and its cells are preferably configured to be independent of each other, there is no theoretical limit to the number of battery panels that can be added to the system depending on the space made available by the traffic cabinet. Additionally, the recharge time of the system can be configured to be independent of the number of battery panels since each charger board 3 charges its own set of battery cells 5. Battery panels can readily be added or removed from the system, as desired, without disrupting the rest of the system.

According to advantageous embodiments, and as shown in FIG. 5, the battery charger board 3 will not enable the battery cells 5 to supply power to the controller/inverter 16 unless commanded by the controller/inverter 16. According to this embodiment, an unconnected battery panel would thus not have any battery voltage on its connector pins in the connector cable 6. This particular embodiment allows for safe "hot swapping" of the battery panels for repair or removal without disruption of the entire system.

The controller preferably is configured to control all of the charger boards 3 in each battery panel of the system and preferably contains or is otherwise operably coupled to an inverter which converts the battery voltage from the battery panels to 120V AC to be distributed to the traffic cabinet and the respective traffic lights it controls. The controller 16 preferably contains all of the intelligence to monitor and control the power within a traffic cabinet. More specifically, the controller 16 can be configured to monitor the status of all battery charger boards 3 and cells 5 and perform regular maintenance on said cells 5. The controller 16 can also be configured to calculate system capacity based upon cabinet load requirements. Still further embodiments allow for the controller 16 to organize and log all power failures and to control the traffic cabinet through its relay and power outputs. Advantageously, it is preferred that the controller 16 can communicate with a personal computer, such as a laptop or other serial interface to either transmit or receive data or to receive instructions from said computer. Based on the above functions of the controller 16, any suitable computer components can be utilized in the converter/inverter 16 to perform its functions, non-exclusively including a hard drive, software, processors, transmitting means, display, inputs, outputs, and memory storage.

Figure 6A:
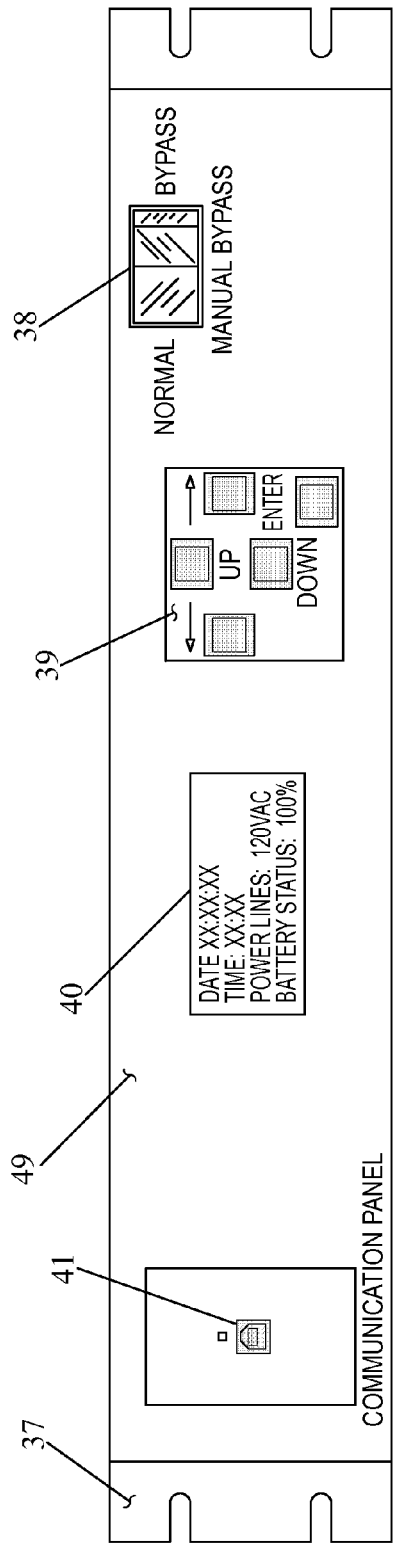
FIG. 6A is a front view of a controller and inverter.

The controller/invertor 16 can be mounted or positioned any suitable position within the traffic cabinet such that it can be communication with the battery panels of the system. FIG. 2A shows a controller 16 positioned in the rack 11 of a cabinet 10. FIG. 6A shows two rail mounting pieces 37 having grooves configured to fit on the rack 11. Additionally, the controller 16 can be positioned on a shelf or other components within a traffic cabinet. The controller 16 can be mounted or not, but when mounted can preferably include means for releasable attachment such that a user can easily install and remove the controller 16 from the cabinet.

Figure 6B:
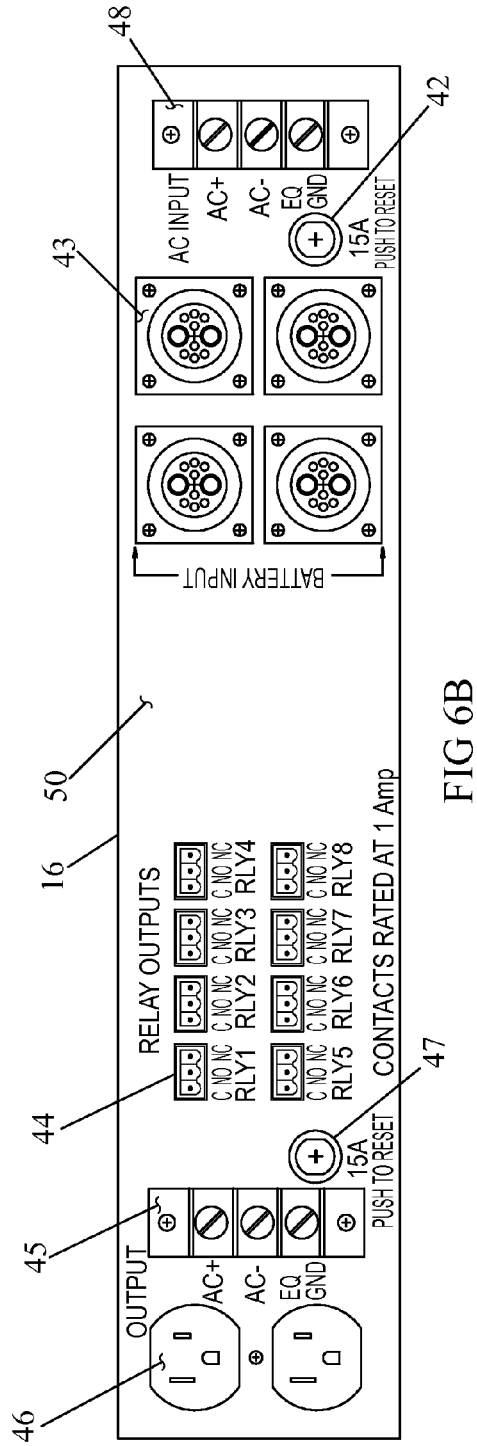
FIG. 6B is a rear view of a controller and inverter.

FIGS. 6A and 6B respectively depict the front and back panels of a preferred converter/inverter 16. With respect to the front panel 49, the controller 16 can include a manual bypass switch 38 which is configured to allow a user to bypass the automated default mode of the controller 16, if desired. User control or data entry into the controller can be transmitted through any suitable interface such as a keypad 39 or other control mechanism. Additionally or alternatively to a keypad, a user can utilize a computer, such as a laptop, to both transmit and receive information to and from the controller 16. More specifically, this can be done through any suitable port, such as a USB port 41 which can connect to a laptop or other computerized device. Monitored system data from the coupled battery panels and the controller 16 can be shown to a user via a display 40, such as an LCD display. Even more specifically, the LCD display can be a 4 line by 20 character display. As an example, the display can include important information such as date, time, power usage, battery status, temperature, and the like. Displayed information can likewise be transmitted for display on a user's computerized device.

With respect to FIG. 6B, a preferred rear panel 50 of the controller/inverter 16 is shown. Connector cables 6 from the battery panels in the system can be plugged into sockets 43 in the controller 16. As shown in FIG. 4, these sockets 43 can alternatively be coupled to a HUB 28 having more sockets to allow for more battery panels to be coupled to the controller 16, beyond the number of sockets 43 present on the controller 16. The rear panel 50 can also include a plurality of relay outputs 44 to control various functions in the traffic cabinet. Input power to the controller 16 can be received from a terminal block 48 and power sockets 43. Power can be transmitted to the traffic cabinet from the controller 16 through a terminal block 45 and one or more power receptacles 46. Input and output circuit breakers 42 and 47 having reset capabilities can also be present on the controller 16. It is expressly noted that features and controls of the controller 16 can be interchanged and moved from the positions shown in FIGS. 6A and 6B including front and real panel interchangeability where suitable.

The invention may be embodied in other specific forms besides and beyond those described herein. The foregoing embodiments are therefore to be considered in all respects illustrative rather than limiting, and the scope of the invention is defined and limited only by the appended claims and their equivalents, rather than by the foregoing description.

What is claimed is:

1. A backup battery system for a traffic cabinet that supplies power to a traffic light, comprising:
    a battery panel comprising a casing containing a plurality of rechargeable non lead-acid battery cells and having a thickness of 2 inches or less, wherein the casing includes at least one slit that defines at least two columns and forming a living hinge between the at least two columns, thereby providing flexibility therebetween along the at least one slit, each column containing a chosen number of the plurality of rechargeable battery cells, and each column individually having an independent charging board for charging and discharging the chosen number of battery cells, and for monitoring a plurality of parameters from its corresponding battery cells;
    wherein the batteries in each column of the at least two columns operate independently of the batteries in the other column of the at least two columns; and
    an electronic controller operably coupled to the charging board of each of the at least two columns of the battery panel for receiving the monitored plurality of parameters, and for transmitting power from the battery panel to the traffic cabinet in a sufficient amount to power the traffic light when there is a primary power failure;
    wherein the battery panel and the controller are configured to be positioned and operably functional within the traffic cabinet.

2. The backup battery system of claim 1, wherein the traffic cabinet comprises a primary rack, two side walls, a top wall, a front wall, and a back wall, and the battery panel fits within the traffic cabinet between the primary rack and at least one of the side walls of the traffic cabinet.

3. The backup battery system of claim 2, wherein the traffic cabinet is a 332 traffic cabinet.

4. The backup battery system of claim 2, wherein the traffic cabinet is a NEMA style traffic cabinet.

5. The battery backup system of claim 1, wherein the casing comprises a plurality of slits separating columns such that the battery panel as a whole can flex.

6. A traffic cabinet system comprising:
    a traffic cabinet having a two side walls, a top wall, a bottom wall, a front wall, a back wall, and an internal rack, and operably coupled to a primary power source for supplying power to a traffic light;
    a flexible battery panel comprising a casing for containing a plurality of rechargeable non-lead battery cells, and having a thickness of 2 inches or less, wherein the casing includes at least one slit that defines at least two columns and forming a living hinge between the at least two columns, thereby providing flexibility therebetween along the at least one slit, each column containing a chosen number of the plurality of rechargeable battery cells, and each column individually having an independent charging board for charging and discharging the chosen number of battery cells;
    wherein the batteries in each column of the at least two columns operate independently of the batteries in the other column of the at least two columns; and
    an electronic controller operably coupled to the charging port of each of the at least two columns of the battery panel for transmitting power from the battery panel to the traffic cabinet in a sufficient amount to power the traffic light when there is a primary power failure;
    wherein the controller is positioned and operably functional within the traffic cabinet, and the flexible battery panel is positioned between the internal rack and at least one of the side walls of the traffic cabinet.

7. The traffic cabinet system of claim 6, wherein the casing comprises a plurality of slits separating columns such that the battery panel as a whole can flex.

8. The traffic cabinet system of claim 6, wherein the traffic cabinet is a 332 traffic cabinet.

9. The traffic cabinet system of claim 6, wherein the traffic cabinet is a NEMA style traffic cabinet.

10. The traffic cabinet system of claim 6, wherein each charging board monitors a plurality of parameters from its battery cells and directs the plurality of monitored parameters to the controller.

* * * * *